Patented Mar. 14, 1939

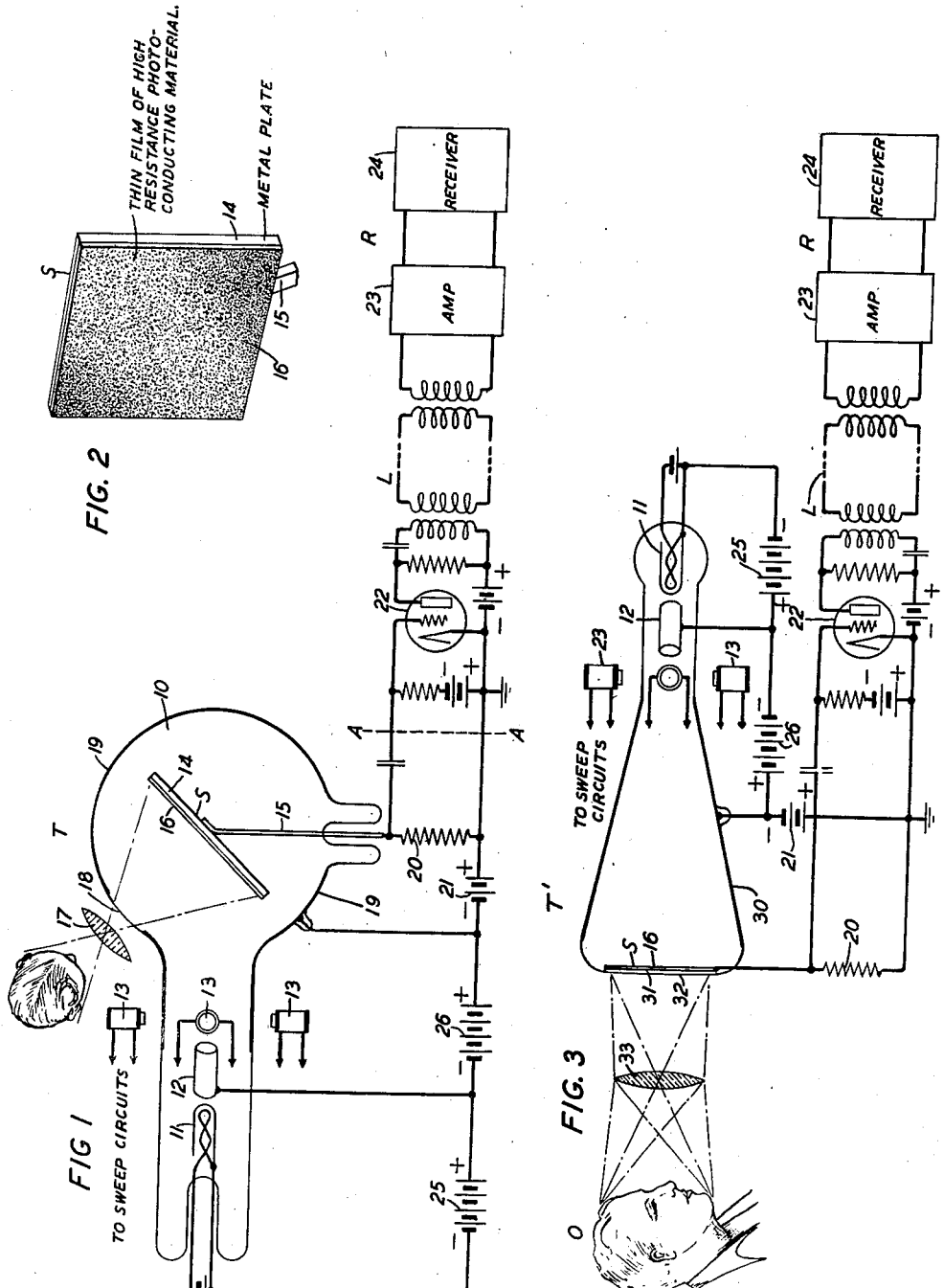

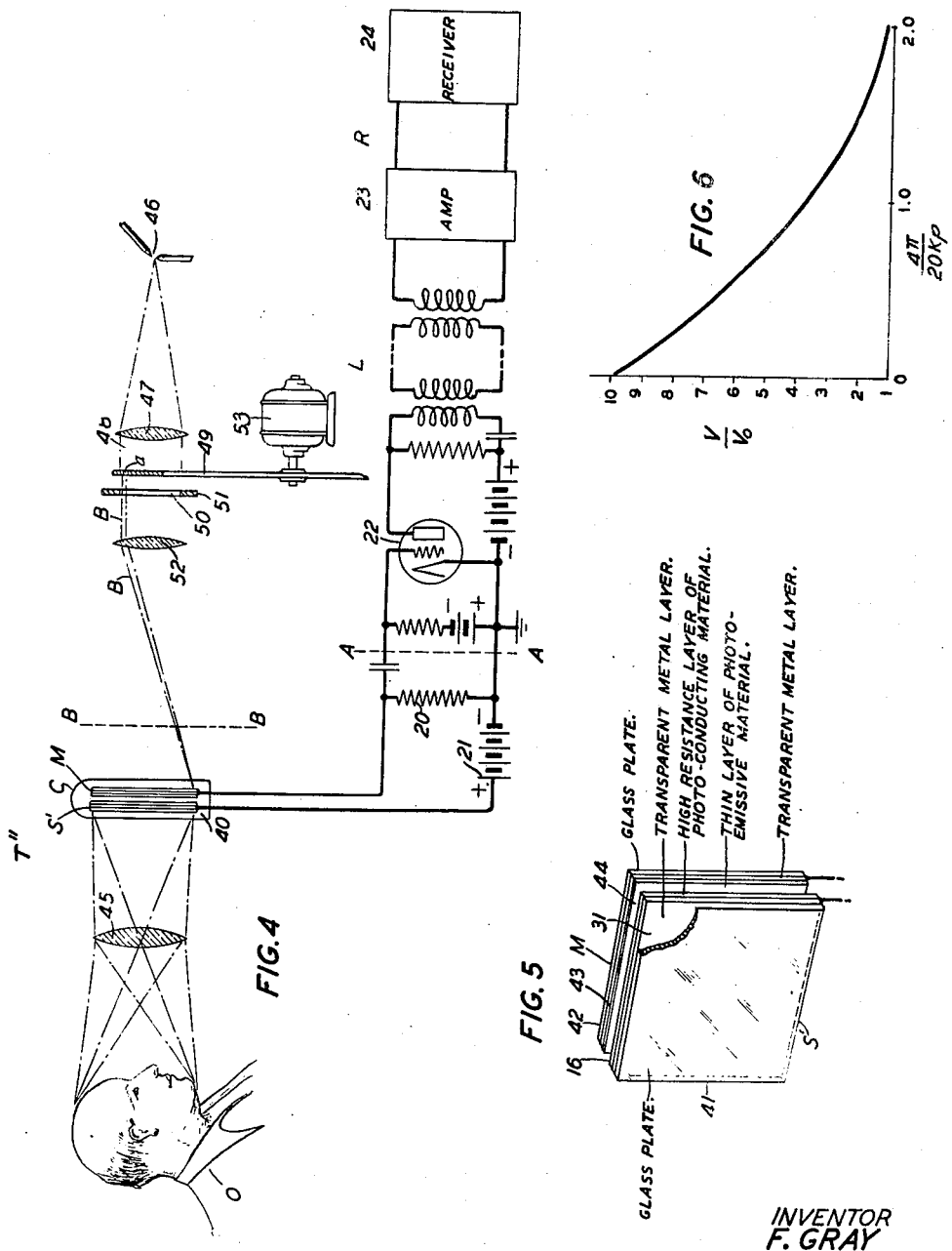

2,150,160

UNITED STATES PATENT OFFICE 2,150,160

ELECTRO-OPTICAL SYSTEM

Frank Gray, New York, N. Y., assignor to Bell Telephone Laboratories, Incorporated, New York, N. Y., a corporation of New York Application March 4, 1936, Serial No. 67,062

8 Claims. (Cl. 178—7.2)

This invention relates to electro-optical systems and more particularly to a method of and means for setting up current variations representative of the various light-tone values of an object, as in television.

An object of this invention is to provide a novel method of and means for translating light variations into corresponding electric current variations.

Another object of this invention is to provide a novel method of and means for translating light variations into electric current variations by utilizing a film of photo-conducting material of high specific resistance upon which the light variations are impressed as a leaky capacity dielectric element for controlling the production of an image current.

A further object is to provide a simple and relatively inexpensive light sensitive screen for use in cathode-ray tubes or in other devices employed for scanning in which the scanning is effected by a beam of radiant energy.

These objects are accomplished in the preferred embodiment of this invention, which is hereinafter described in detail, by providing a target or screen upon which an image of an object to be televised is focussed by a suitable lens system and which target is scanned by a beam of electrons. This beam of electrons may be produced within a cathode ray tube, the target being also within this tube, or it may be produced by a photo-emissive element activated by a moving beam of radiant energy produced by means outside the container enclosing the target or screen. This target or screen preferably comprises a metal layer upon which is coated a very thin layer or film of very high resistance photo-conducting material. The object may be in front of or in back of the film; and if in back, the metal layer is transparent to the light from the object.

According to the present theory of operation of this device, as the beam of electrons successively passes over the elemental areas of the photo-conducting film, electrons in substantially the same amount are deposited on each elemental area of the front surface of the photo-conducting film or elemental positive charges are produced on this front surface due to secondary electronic emission from the film induced by the electronic scanning beam. These uniform elemental charges charge up the elemental capacities between this front surface and the metal plate. During the interval of time between successive scannings of the same elemental area, which is usually of the order of $\frac{1}{20}$ of a second for television systems, this elemental capacity partially discharges through the photo-conducting material in accordance with the light intensity falling on the elemental area from the object. On the next passage of the beam the capacity is again charged to its original value and the instantaneous surge through the capacity and external circuit is proportional to the charge that leaked off during the preceding $\frac{1}{20}$ of a second. The successive surges from the elemental areas charged in turn produce a television or image current which flows through a resistance in the grid circuit of a transmitting amplifier.

In order to operate satisfactorily in accordance with this invention, the photo-conducting film should be of such high specific resistance that the passage of a scanning beam over said film results in the formation of a temporary charge on its front surface which slowly leaks through the film at each elemental area thereof at a rate dependent upon the illumination of said area. The photo-conducting material employed in carrying out this invention is not that heretofore used in electro-optical scanning, such as selenium in its ordinary form, but must be a material having greater specific resistance. Ordinary selenium has a specific resistance much too low to permit of its use in devices operating according to this invention. As this film is very thin, there is a relatively large capacity between the front surface of the film and the metal plate contiguous to its rear surface, which capacity makes possible an image current of considerable amplitude.

The invention will be more readily understood by referring to the following description taken in connection with the accompanying drawings forming a part thereof, in which:

Fig. 1 is a diagrammatic representation of a television system including the invention;

Fig. 2 is an enlarged perspective view of the target or screen used in the system shown in Fig. 1;

Fig. 3 diagrammatically illustrates a second television system involving the invention;

Fig. 4 shows a system involving the invention in which a scanning tube is used;

Fig. 5 is an enlarged perspective view of the assembly within the scanning tube shown in Fig. 4; and Fig. 6 is a graphical representation used to help explain the operation of the invention.

Referring more particularly to the drawings, the system of Fig. 1 comprises in general a television transmitting station T, suitable connecting media L, and a television receiving station R.

The transmitter T may comprise a cathode ray tube 10, including a target or screen S, suitable means for forming an image of an object or field of view O on the target S and means, such as the cathode ray beam of the cathode ray tube 10, for causing the target to be scanned with a beam of electrons.

The cathode ray tube 10 comprises a means, such as a cathode 11 and an anode 12, for producing a thin beam of electrons which is directed toward the composite target or screen S. The cathode beam of the tube 10 is deflected in two directions at right angles to each other and at such relative speeds in the two directions that the screen S is impinged upon by a moving pencil of electrons which moves, for example, across the screen in a series of parallel lines from top to bottom in a time interval within the period of persistence of vision. Deflection of the beam in the two directions is effected in any desirable manner such as by the electromagnetic fields produced by the four magnetic coils 13 outside the cathode ray tube 10. These magnetic coils are supplied with currents of saw-toothed wave form, the frequencies of these currents being such that the target S is completely scanned in a time interval within the period of persistence of vision.

The target or screen S upon which the stream of electrons impinges comprises a metal plate 14 supported from the side of the tube by any appropriate means such as a bracket member 15. On the side of the plate 14 near the beam of electrons there is coated a thin layer 16 of high resistance photo-conducting material. What constitutes "high resistance" as applied to the layer 16 will be pointed out in detail hereinafter.

Associated with the cathode ray tube 10 is an optical means for directing an image of an object or field of view O upon the target or screen S. The object or field of view O is illuminated by radiations from a suitable source (not shown) and radiations reflected from the object are gathered by an optical system, represented generally by the lens 17, and projected through a transparent window 18 in the cathode ray tube 10 upon the front surface of the photo-conducting layer 16 of the target S.

Assuming that the initial charge produced upon the target by the action of the electron beam is negative, the operation of the cathode ray tube 10 may be as follows, it being understood that it appears to be possible to operate the device either in such a manner as to cause the initial charge of the photo-conducting layer to be negative or, by proper manipulation in accordance with well-known principles controlling the production of secondary electronic emission, to cause the initial charge to be positive.

The cathode ray beam is formed by the cathode 11 and an anode 12 and accelerated towards the target S by means of the anode 12. Due to the action of the magnetic deflecting coils 13 which are spaced 90 degrees apart outside the tube the electron beam is caused to scan every elemental area of the photo-conducting layer 16 in a time interval within the period of persistence of vision. The passage of the scanning beam over this film results in the laying down of a substantial negative charge of electricity on its front surface. Those electrons that are not retained on the surface of the film are attracted by the anode coating 19. The radiations from the object cause the photo-conducting film to become slightly conducting, the degree of conductivity of any elemental area depending on the intensity of the radiations falling therein which in turn is dependent on the light-tone value of the corresponding elemental area of the object or field of view O. The photo-conducting layer 16 is of such high specific resistance that it can be considered as a dielectric element between the negative charge on its front surface (created by the laying down of electrons from the electron beam) and the positively charged metal plate 14 contiguous to the rear surface of the photo-conducting film 16. Although the photo-conducting member 16 must be practically a dielectric, it must also possess photo-conducting properties so that during the time interval between successive scannings of the same elemental area, which in ordinary television systems is of the order of $\frac{1}{20}$ of a second, the amount of the charge leaking off to the metal plate 14 through the film 16 is proportional to the light-tone values of the object or field of view. Thus, each elemental capacity is partially discharged through the photo-conducting material in accordance with the light intensities falling on the elemental areas of the film 16 from the object O. On the next passage of the cathode ray beam, each elemental capacity is again charged to its original value and the instantaneous surge through the circuit comprising the elemental capacity and the external circuit including the resistance 20 and the battery 21, is equal to the charge that leaked off during the preceding $\frac{1}{20}$ of a second. The battery 21 has its positive pole connected to the metal plate 14 through the resistance 20.

In case the electron beam produces electronic bombardment sufficient to leave the front surface of the photo-conducting film positively charged, the operation appears to be like that described above with the exception that the surges are produced by the replacement of positive charged, the operation appears to be like that de- conducting film instead of negative. In this case the polarity of the battery 21 may be reversed.

Experiments have shown that the device operates with the battery 21 poled as shown in the drawings or with its polarity reversed, or with this battery omitted entirely. For example, the apparatus has been operated with the voltage of the battery 21 three or four volts and the voltage of the anode coating 19 with respect to the cathode 11 from 700 to 1400 volts. These values, however, are not critical, being here mentioned merely as illustrative.

If the photo-conducting layer 16 is made quite thin, the current surge may be a large one because of the large capacity effect. The successive surges from the elemental areas recharged in turn produce a television or image current which flows through the external circuit.

The image current which flows through the resistance 20, after being raised to the desired power level by the device 22, which may comprise a multi-stage amplifier, is transmitted over suitable connecting means L to a remote station including a receiver R. In line carrier or radio transmission, the amplified image current is used to modulate a carrier current of the proper frequency for transmission.

The receiving station R may comprise an amplifier 23, the output circuit of which includes a television receiver 24. Any suitable receiver for the purpose may be used. A satisfactory receiver utilizing a glow discharge lamp and a scanning disc is disclosed in U. S. Patent 1,728,122, September 10, 1929, to Horton. A suitable receiver utilizing a cathode ray tube is disclosed in application Serial No. 466,067 of J. B. Johnson, filed July 7, 1930.

Fig. 2 shows an enlarged perspective view of the target or screen 10. The metal plate 14 is made of any suitable conducting material such as nickel. This plate is connected by the bracket member 15 to one terminal of the battery 21 through the resistance 20. Upon the surface of the metal plate remote from the bracket member 15 is coated a thin film 16 of high resistance photo-conducting material. This film is so thin that there is a considerable capacity between its front surface and the metal plate contiguous to its rear face. Since the film is quite thin and is of high specific resistance, its lateral conductivity is negligible in comparison with its conductivity through the film, and there is no serious loss of image detail due to lateral flow of currents. Experiments and calculations indicate that the film should be thinner than the diameter of an elemental area (assuming the elemental scanning spot to be circular). Thus, a film having a thickness of $\frac{1}{10}$ of the diameter of an elemental area was found to have negligible loss of image detail due to lateral flow of current. For a more complete description of the relation between the thickness of a high resistance film and the lateral flow of current therein, reference may be made to application Serial No. 67,057, filed March 4, 1936, for Frank Gray. If desired, the lateral conductivity may be decreased by roughening or scoring the surface of the metal plate. The material of the film 16 should be of high enough specific resistance so that the charge applied to its front surface by the scanning beam leaks through the film slowly, the rate of leakage, of course, being dependent upon the illumination of the particular elemental area.

The reason why the layer 16 of photo-conducting material must have such a high specific resistance, will be clear from the following considerations. Let it be assumed that the scanning beam has just passed over an elemental area of the film 16. Immediately after the passage of this cathode beam, there is a voltage drop $V_0$ across the elemental capacity existing between the front surface of this film for the particular elemental area and the metal plate contiguous to the rear surface of the film. If this particular elemental area is exposed to light from the object or field of view O, the voltage across the film decreases as the charge leaks through it.

The capacity of any area A on the film is:

$$C = \frac{KA}{4\pi l} \quad (1)$$

where $l$ is the thickness of the film and $K$ is its dielectric constant. The corresponding resistance through the film is $$R = \frac{l\rho}{A} \quad (2)$$

where $\rho$ is the specific resistance of the film under the illumination of that particular part of the image. After the passage of the beam, the voltage across the film decreases according to the equation $$V = V_0 e^{-\frac{t}{RC}} \quad (3)$$

where $V_0$ is the voltage across the film immediately after the scanning beam has passed and $V$ is the voltage at any time $t$ thereafter. If it is assumed that this time $t$ is $\frac{1}{20}$ of a second, and this value is substituted in Equation (3), the voltage can be said to have reached the value $$V = V_0 e^{-\frac{1}{20RC}} \quad (4)$$

which becomes, after substituting the values of $C$ and $R$ from Equations (1) and (2)

$$V = V_0 e^{-\frac{4\pi}{20K\rho}} \quad (5)$$

It is interesting to note that the final voltage ratio $$\frac{V}{V_0}$$

is independent of the thickness of the film and depends only on its specific resistance and dielectric constant.

Fig. 6 shows the relation existing between the ratio $$\frac{V}{V_0}$$

and the term $$\frac{4\pi}{20K\rho}$$

From a study of this curve it is readily apparent that the response of the apparatus to light is approximately linear if the ratio $$\frac{V}{V_0}$$

has not dropped to too low a value at the end of a scanning period. Thus, to preserve this approximately linear relation, it is necessary to place the limit of $$\frac{V}{V_0}$$

for the portion of the film illuminated by radiations from the brightest elemental areas of the object at about 0.4. At this limit for $$\frac{V}{V_0}$$

it is easily ascertained that the value $$\frac{4\pi}{20K\rho}$$

must be less than 1.0 for this linear relation or, differently stated, that the specific resistance $\rho$ should be at least equal to $$\frac{4\pi}{20K} \text{ E. S. U.}$$

As it is desired to have as small a ratio of $$\frac{V}{V_0}$$

as possible to insure a large leakage, it can be said that the optimum value for $\rho$ for a scanning interval of $\frac{1}{20}$th of a second should be $$\frac{4\pi}{20K} \text{ E. S. U.}$$

or $$1.8 \cdot \frac{\pi}{K} 10^{11} \text{ ohms per cm.}^3$$

as for practical purposes 1 E. S. U.$=9 \times 10^{11}$ ohms. This can be written $$\rho = \frac{5.66 \times 10^{11}}{K} \text{ ohms per cm.}^3 \quad (6)$$

This indicates that the specific resistance of the film in the strongest illumination from the object should be quite high. It should, for instance, be of the order of the specific resistance of wood or Bakelite, and it should be far greater than that of the usual selenium film. If the material has a high sensitivity to light, this resistivity may be attained by regulating the amount of light from the brightest portion of the object which reaches the film 16, provided of course, that the dark specific resistance of the film is greater than the optimum value of $\rho$ given above in Equation (6).

If it be assumed that $t=\frac{1}{10}$ second, it will be seen that the optimum value for $\rho$ will be $$\frac{4\pi}{10K} \text{ E. S. U.}$$

which becomes $$\frac{11.32 \times 10^{11}}{K} \text{ ohms per cm.}^3$$

If it be assumed that $t=\frac{1}{30}$ second, it can be shown similarly that $\rho$ should have an optimum value of $$\frac{3.78 \times 10^{11}}{K} \text{ ohms per cm.}^3$$

For $t=\frac{1}{60}$ second, $\rho$ should have an optimum value of $$\frac{1.89 \times 10^{11}}{K} \text{ ohms per cm.}^3$$

At the present stage of the art, a scanning frequency of sixty frames per second appears to be higher than anything likely to be used in practice and is here mentioned merely to illustrate an extreme case. Thus, it can be stated as a generalization that, in order to produce optimum results in the operation of this invention, the photo-conducting layer should have the property that, when illuminated by light from the brightest elemental areas of the object, the product of the specific resistance and the dielectric constant of the material should be at least $10^{11}$ ohms per cm.³.

With the above requirement in mind, the sensitivity of the apparatus will now be considered. For a plate $b$ cm. square, scanned $n$ times per second, the area charged by the beam during any time $t$ is $$A = nb^2 t \qquad (7)$$

and the corresponding capacity is $$c = \frac{K}{4\pi l} \cdot nb^2 t \qquad (8)$$

The cathode ray beam changes the voltage from its final value $V$ to its initial value $V_0$, and the charging current at any instant is, therefore, $$I = \frac{dq}{dt} = \frac{d}{dt}[(V_0 - V)c] \text{ E. S. U.} \qquad (9)$$

Substituting the value of $c$ from Equation (8) in this expression and differentiating with respect to $t$ the expression becomes $$I = (V_0 - V) \cdot \frac{nKb^2}{4\pi l} \text{ E. S. U.} \qquad (10)$$

or $$I = (V_0 - V) \cdot \frac{nKb^2}{36\pi l} \times 10^{-11} \text{ amperes} \qquad (11)$$

where $(V_0 - V)$ is expressed in volts. The sensitivity of the apparatus is thus proportional to the area of the film, and is inversely proportional to its thickness.

Assume, for example, that the film is 5 cm. square and that it has a thickness of $2.5 \times 10^{-3}$ cm. If these values are substituted for $b$ and $l$ respectively, the current $I$ when $N=20$ is $$I = (V_0 - V) \cdot 1.77 \times 10^{-8} \cdot K \text{ amperes} \qquad (12)$$

The value of $$\frac{V}{V_0}$$

from the curve shown in Fig. 6 corresponding to the optimum value for $\rho$ ($t$ equals $\frac{1}{20}$ of a second) is approximately 0.4. Thus the value of $(V_0 - V)$ is 0.6 $V_0$ and the current is $$I = 1.06 \, V_0 \times 10^{-8} \text{ amperes} \qquad (13)$$

if the dielectric constant is considered as unity. A dielectric constant larger than unity tends to increase the value of the current in this expression. This current is considerably larger than that necessary to produce a satisfactory signal impulse. In fact, the specific resistance may be larger than the optimum value given in Equation (6) (thus producing a larger $$\frac{V}{V_0}$$

and a smaller $V_0 - V$) and still give a fairly large output.

It is, of course, necessary that the dark current be small compared with the bright current. That is, the specific resistance of the photo-conducting film 16 should be much larger for the dark condition than for the bright condition.

In the example just given, in addition to considering the requirements necessary to give an image current of workable amplitude, it is necessary to consider the requirements to avoid diffusion due to the lateral conductivity of the photo-conducting layer. Assuming that the scanning spot is about $1 \times 10^{-1}$ cm. in diameter, the thickness of the film ($2.5 \times 10^{-3}$ cm.) is about $\frac{1}{40}$ of the diameter of the spot. As pointed out in the co-pending Gray application referred to above, the diffusion from an elemental area due to the lateral spread of current is negligible at a distance away from the edge of the elemental area greater than twice the thickness of the film and that within this distance the lateral spread can also be neglected if this distance is of the order of $\frac{1}{4}$ or $\frac{1}{5}$ of the diameter of the scanning spot (which determines the size of the elemental area) or less. Thus, it is clear that the diffusion in the example given, in which twice the thickness of the layer is only $\frac{1}{20}$ of the size of the elemental area, is so small as to practically eliminate diffusion.

As a second example, let it be assumed that the area of the target is increased to 100 square cm., the definition is increased to 250 lines, the thickness of the photo-conducting layer is reduced to $10^{-3}$ cm., the diameter of the scanning spot is $4 \times 10^{-2}$ cm., $V_0$ is 50 volts and $K$ is 6. From Equation (11) it is readily calculated that the current $I$ is about $3.18 \times 10^{-5}$ amperes, which is a larger current than necessary to give good results. The thickness of the photo-conducting layer is, as in the first example, $\frac{1}{40}$ the diameter of the scanning spot, thus insuring freedom from diffusion due to lateral conductivity of the layer.

From the above it is clear that the photo-conducting material must possess a specific resistance when illuminated by the brightest portions of the object greater than that possessed by photo-conducting materials ordinarily used in light-sensitive electric devices. Selenium, for example, has been found to be unsatisfactory. As example of materials which may be used, mention may be made of mercury iodide ($HgI_2$) or native sodium chloride, or suitable alloys of selenium and higher resistance materials. It is obvious, however, that the invention is not limited to the use of any of these specific materials as any material meeting the requirements laid down above may be used.

In Fig. 3 the target or screen S is placed on the end wall of the cathode ray tube 30 and the object is arranged in back of the film. The metal plate 14 of the target in Fig. 1 is replaced by a thin transparent metal layer 31 which is contiguous to the end wall 32 of the tube 30. On this metal layer 31 there is coated a very thin film 16 of high resistance photo-conducting material which is similar to that used for the film 16 shown in Fig. 1.

The operation of the cathode ray tube 30 is as follows:

A beam of electrons is formed and caused to scan successively the elemental areas of the film 16 in a manner similar to that described above with reference to Fig. 1. The metal layer 31 is connected to one terminal of the battery 21 and there is a capacity formed between this plate and the charge produced on the front surface of the film 16 by the electron beam. As disclosed above with reference to Fig. 1, this charge may be either positive or negative, depending upon the various considerations described in connection with that figure. Radiations from the object are gathered by a lens system, represented generally by the lens 33, and directed through the end wall 32 of the tube 30 and the transparent metal layer 31 upon the back surface of the film 16 and cause its respective elemental areas to be made slightly conducting, the degree of conductivity of any elemental area depending on the light-tone value of the corresponding elemental area of the object. The leakage of current from the front surface of the film 16 through the film to the metal layer 31 for any elemental area is therefore dependent upon the light-tone value of the corresponding elemental area of the object. The recharging current caused by the next passage of the scanning beam of electrons over the elemental area causes a surge of current through the external circuit including the resistance 20. Successive surges, therefore, form an image current which is amplified by the device 22 and transmitted over connecting media L to the receiving device R which includes an amplifier 23 and a suitable receiver 24.

Fig. 4 discloses a modification of the television system shown in Fig. 1. The transmitter T'' in the system shown in Fig. 4 includes a self-contained scanning unit or tube, an optical system for forming an image of an object or field of view O on a target or screen S' of the scanning unit or tube C, and an optical means for producing a moving beam of radiations for scanning the target.

In order to more fully understand the operation of the system shown in Fig. 4, reference will now be made to Fig. 5 which shows an enlarged perspective view of the assembly within the scanning tube C. The tube C comprises a gas-tight container 40 enclosing an assembly including a screen or target S' and a scanning means M adjacent said screen and slightly spaced therefrom. The target or screen S' is similar to the screen S of Fig. 3 except that it has a glass supporting plate. The target S' comprises elements in the following order (starting from the side near the object or field of view O): a transparent plate 41 of glass or similar material coated with a transparent metal layer 31 (which is preferably a thin coating of silver) carrying a thin layer 16 of high resistance photo-conducting material, such as is used in the similar films shown in Fig. 1 and Fig. 3. The scanning means M comprises (starting from the side farther away from the object or field of view O) a glass plate 42 carrying a transparent metallic layer 43 which,
in turn, is coated with a thin layer 44 of suitable photo-emissive material. This layer 44 may be darkened by means of a thin coating of an opaque material, such as carbon, in order that the moving beam of light shall not strike the target S'. The metal layer 31 is, by way of example, connected to the positive terminal of the battery 21 and the metal layer 43 is connected to the negative terminal of the battery 21 through resistance 20. Either the screen or the scanning means may be mounted on a wall of the scanning tube in which case one of the glass supporting plates may be dispensed with as the wall of the tube is sufficient for the purpose.

The object or field of view O is illuminated by radiations from a suitable source (not shown) and radiations reflected from this object are gathered by a suitable optical system, represented generally by the lens 45, and projected through the transparent plate 41 and the transparent metallic layer 31 upon one face of the photo-conducting layer or film 16 whereby the conductivities of small areas of this layer are respectively controlled in accordance with the intensity of the radiations incident thereon and hence in accordance with the tone values of the corresponding elemental areas of the object.

Associated with the scanning tube C is a second optical means comprising a source of radiations 46 and a lens system, represented generally by lens 47, for gathering radiations from the source 46 and supplying them in the form of a beam 48 of parallel rays to a peripheral portion of the disc 49 provided with a series of apertures a arranged in the form of a spiral, through which, one at a time, portions of the beam from the source 46 pass to produce a moving beam of radiations B of small dimensions, which passes through an opening 50 in an opaque mask or shutter 51 and a lens system illustrated generally as a lens 52. The radiations from the source 46 may be within or without the visible spectrum. If ultra-violet radiations are used, the lens in the optical system 52 should be of a material which will transmit such rays, such for example, as quartz, and in certain cases it might be desirable to include in the optical system, represented by the lens 52, a suitable optical filter to filter out undesired radiations. The moving beam of radiations B passes through the glass plate 42 and transparent metal layer 43 to sweep across the photo-emissive material 44 of the scanning means M. The opening 50 is of such shape and dimensions that light from only one aperture is permitted to emerge at a time.

The disc 49 is driven by a motor 53 to cause the apertures a to pass through the beam 48 and thereupon produce a moving beam of radiations B which traverses successive unit lines of the photo-emissive film 44, once per revolution and in a time interval less than the period of persistence of vision, whereby the film 44 is activated to cause the production of a moving spot of photoelectric emission which is attracted to the film 16 because of the positive bias of the metal layer 31 forming a backing for the photo-conducting film 16.

The moving spot of photoelectric emission causes a negative charge to be applied to the surface of the film 16 adjacent the scanning means M in a manner similar to the operation of the cathode ray beam in Fig. 3. With this one exception, that is, the means for producing the beam of electrons to scan one surface of the film 16, the method of forming the image current is similar to that described above with reference to Fig. 3. The screen or target S' and the scanning means M are placed close together so that there will be substantially no diffusion of the electron beam. The portion of the system shown in Fig. 4 to the right of the line AA is similar to the corresponding apparatus shown to the right of line AA in Fig. 1.

As a modification, the portion of Fig. 4 to the right of line BB may be replaced by any other means for producing a moving beam of radiations, as for example, a cathode ray tube equipped with a fluorescent screen cooperating with a suitable optical system. Such an arrangement is shown in an application Serial No. 67,058, filed March 4, 1936, for Frank Gray.

While the photo-conducting film in its preferred embodiment is continuous, it is obvious that the film may be discontinuous and the arrangement still operate.

Other changes may be made without departing from the spirit or principles of the invention as hereinbefore expressed, the scope of which is defined by the appended claims.

What is claimed is:

1. In an electro-optical system, an electrical capacity means comprising a conductive plate-like member and a continuous film of photo-conducting material on said member acting as the dielectric of said capacity means, said film having when brightly illuminated a resistivity of at least $10^{10}$ ohms per centimeter cube and sufficient conductivity to slowly discharge a charge on said capacity means, scanning means for repeatedly producing a charge on the surface of said film remote from said plate-like member element by element in succession at a periodicity such that any charge on the surface of an illuminated portion of said film is materially reduced by leakage through said film between successive scannings, and means for non-uniformly illuminating said surface.

2. In an electro-optical system, an electrical capacity means comprising a conductive plate-like member and a photo-conducting film on said member acting as the dielectric of said capacity means, said film, when illuminated, having a resistivity of at least $10^{10}$ ohms per cubic centimeter and sufficient conductivity to slowly discharge a charge on said capacity means, scanning means for repeatedly producing a charge on the surface of said film remote from said plate-like member element by element in succession at such a periodicity that any charge on the surface of an illuminated portion of said film is materially reduced by leakage through said film throughout the period between successive scannings, and means for non-uniformly illuminating said surface, said means for producing the charge on said surface comprising an electron emitting cathode, and means for forming the emitted electrons into a beam and for causing said beam to scan said surface element by element.

3. In an electro-optical system, an electrical capacity means comprising a conductive plate-like member and a photo-conducting film on said member acting as the dielectric of said capacity means, said film, when illuminated, having a resistivity of at least $10^{10}$ ohms per cubic centimeter and sufficient conductivity to slowly discharge a charge on said capacity means, scanning means for repeatedly producing a charge on the surface of said film remote from said plate-like member element by element in succession at such a periodicity that any charge on the surface of an illuminated portion of said film is materially reduced by leakage through said film between successive scannings, and means for non-uniformly illuminating said surface, said means for producing the charge on said surface comprising an electron emitting cathode, means for forming the emitted electrons into a beam and for causing said beam to scan said surface element by element, a current path between said cathode and said plate-like member and a source of potential in said path for maintaining an electric charge on said plate-like member.

4. In an electro-optical system, an electrical capacity means comprising a conductive plate-like member and a photo-conducting film on said member acting as the dielectric of said capacity means, said film, when illuminated, having a resistivity of at least $10^{10}$ ohms per cubic centimeter and sufficient conductivity to slowly discharge a charge on said capacity means, scanning means for repeatedly producing a charge on the surface of said film remote from said plate-like member element by element in succession at such a periodicity that any charge on the surface of an illuminated portion of said film is materially reduced by leakage through said film between successive scannings, and means for non-uniformly illuminating said surface, said means for producing the charge on said surface comprising an electron emitting cathode, means for forming the emitted electrons into a beam and for causing said beam to scan said surface element by element, and a current path between said cathode and said plate-like member containing a source of steady potential with its positive pole toward said plate-like member.

5. In an electro-optical system, an electrical capacity means comprising a conductive plate-like member and a photo-conducting film on said member acting as the dielectric of said capacity means, said film, when illuminated, having a resistivity of at least $10^{10}$ ohms per cubic centimeter and sufficient conductivity to slowly discharge a charge on said capacity means, scanning means for repeatedly producing a charge on the surface of said film remote from said plate-like member element by element in succession at such a periodicity that any charge on the surface of an illuminated portion of said film is materially reduced by leakage through said film between successive scannings, and means for non-uniformly illuminating said surface, said means for producing the charge on said surface comprising an electron emitting cathode, means for forming the emitted electrons into a beam and for causing said beam to scan said surface element by element, and a current path between said cathode and said plate-like member containing a source of steady potential with its negative pole toward said plate-like member.

6. An electro-optical system including a scanning device comprising a container enclosing a member having a light sensitive photo-conducting layer and a second member having a light sensitive photo-emissive layer parallel to said first layer, said first layer being adapted to be illuminated by light from an object field, means for causing a spot of light to move over said second light sensitive layer element by element, and means for positioning said layers with opposed surfaces in close spaced relation so that the electrons emitted at each instant from said second layer under the action of said light in the form of a free beam of electrons impinge upon a corresponding element of said first layer.

7. A cathode ray tube comprising a cathode, a tube-like anode, a plate-like target, said target being light sensitive on the face therof toward said cathode and having a portion thereof remote from said cathode of high electrical conductivity and a portion near said cathode of a photo-conducting material having a specific resistivity of at least $10^{10}$ ohms per centimeter cube, a second anode member, circuit connections between said second anode member and the portion of said target of high conductivity, a source of direct potential in said circuit, a second source of direct potential having its positive pole connected to said second anode member and its negative pole connected to said tube-like anode, a third source of direct potential having its positive pole connected to said tube-like anode and its negative pole connected to said cathode, and means to cause said cathode beam to successively scan the elemental areas of said target, said target being adapted to receive an optical image of an object external to said tube.

8. An image current producer comprising a layer of photo-conducting material, means for illuminating a surface of said layer with light controlled by an object field, a photo-emissive member cooperating with said layer, and means for causing said member to be scanned by a beam of light to produce a scanning beam of electrons directed toward said layer.

FRANK GRAY.